United States Patent [19]

Blackburn et al.

[11] Patent Number: 4,709,987
[45] Date of Patent: Dec. 1, 1987

[54] PRESSURE AND TEMPERATURE INSENSITIVE GLASS AND OPTICAL COATINGS AND FIBERS THEREFROM

[75] Inventors: Douglas Blackburn, Damascus; Albert Feldman, Rockville; Nicholas Lagakos, Silver Spring, all of Md.

[73] Assignee: The United States of America as represented by the Secretary of the Navy, Washington, D.C.

[21] Appl. No.: 807,150

[22] Filed: Dec. 10, 1985

[51] Int. Cl.[4] ................................. G02B 6/44
[52] U.S. Cl. ................................. 350/96.34; 501/37; 501/73
[58] Field of Search ............... 350/96.34; 501/37, 38, 501/73, 77

[56] References Cited

U.S. PATENT DOCUMENTS 4,427,263  1/1984  Lagakos et al. ............ 350/96.34
4,482,205  11/1984  Lagakos et al. ............ 350/96.33
4,495,298  1/1985  Yamagishi et al. ............ 501/73

OTHER PUBLICATIONS

Applied Optics, vol. 20, p. 2716, Aug. 1, 1981, No. 15, "Pressure Desensitization of Optical Fibers", Lagakos et al.

Primary Examiner—Eugene R. LaRoche
Assistant Examiner—James C. Lee
Attorney, Agent, or Firm—John L. Forrest; Wendell R. Guffey; Thomas E. McDonnell

[57] ABSTRACT

Pressure and temperature insensitive optical fibers are produced using a $Ta_2O_5$ based glass composition which has a high bulk modulus and a low thermal expansion coefficient. The glass composition can function as the cladding in the optical fiber or as a protective coating which surrounds the cladding thereby protecting the fiber from fluctuations in temperature and pressure.

23 Claims, 6 Drawing Figures

30 - High Silica Fiber Core (5μm)
32 - Optical Fiber Cladding (30μm)
34 - Silica Substrate (80μm)
36 - High Young's Modulus Coating (280μm)
38 - High Silica Surface Compressing Layer (330μm)

4,709,987

PRESSURE AND TEMPERATURE INSENSITIVE GLASS AND OPTICAL COATINGS AND FIBERS THEREFROM

BACKGROUND OF THE INVENTION

This invention relates generally to glass compositions and more particularly to low compressibility, low expansivity glass compositions for use with optical fibers.

Typical optical fibers have a core of material with a refractive index higher than the refractive index of the surrounding cladding material, thus permitting light propagation by internal reflection. The materials used to produce the core and cladding are glass compositions designed to provide the proper refractive indexes to permit light propagation in the fiber.

In addition, the optical fiber is generally coated with one or more substrate layers of material to protect the optical fiber from the environment. These substrate coatings are typically moisture proof plastic, metal, or rubber materials which have mechanical strength and chemical durability. For example, U.S. Pat. No. 4,213,672 to Autlich et al. discloses a single and double layer plastic substrate coating.

Prior methods and coating materials have, however, offered little protection from fluctuations in the transmitted signals caused by certain variations in the external environment. Optical path variations caused by external pressure and temperature fluctuations can interfere with long distance signal transmissions, particularly with optical fibers used with acoustic sensors at significant ocean depths.

Temperature sensitivity can be an important consideration in optical fiber design. In communication systems, changes in phase can deteriorate the signal in high-bandwidth communications. Temperature-induced phase shifts add to the noise in fiber sensors, e.g. acoustic, magnetic, and gyroscopic. Similar problems exist with fiber-optic temperature sensors in that the sensing fiber should be temperature sensitive, but the optical fiber lead and reference fiber should not be. Attempts to eliminate the effects of temperature on optical fibers have generally involved matching the glass compositions of the core, cladding, and substrate so as to prevent interference by temperature fluctuations. U.S. Pat. No. 4,482,205 to Lagakos et al. discloses an optical fiber made temperature insensitive by matching the Young's modulus, expansion coefficient and Poission ratio of the fiber components. Another example of this work is Lagakos et al. "Temperature-Induced Optical Phase Shifts in Fibers" App. Optics 20:13, p. 2305-8, July 1, 1981, which discusses maximizing the temperature sensitivity of the fibers.

More recent attempts to eliminate the effects of pressure on optical fibers have involved adding extra protective layers on top of the glass fiber. U.S. Pat. No. 4,427,263 to Lagakos et al. discloses an optical fiber waveguide rendered pressure insensitive by concentrically surrounding it with a substrate of high bulk modulus material having a wall of selected thickness whereby acoustic pressures on the waveguide induce phase change cancellations.

Prior methods have not yielded a substrate coating material which effectively eliminates the interference caused by fluctuations in temperature and pressure. A protective composition which can produce optical fibers insensitive to these pressure and temperature fluctuations is needed to minimize the interference and to maximize the signal to noise ratio in the transmitted signal.

SUMMARY OF THE INVENTION

It is, therefore, an object of the present invention to provide a protective composition for optical fibers which will minimize the interference in transmitted signals caused by fluctuations in temperature.

It is another object of the present invention to provide a protective composition for optical fibers which will minimize the interference in transmitted signals caused by fluctuations in pressure.

It is another object of the present invention to provide an optical fiber which will minimize the interference in transmitted signals caused by fluctuations in temperature.

It is further object of the present invention to provide an optical fiber which will minimize the interference in transmitted signals caused by fluctuations in pressure.

These and other objects are accomplished by using a glass composition which has a high Young's Modulus(E) and a low linear thermal expansion coefficient($\alpha$) to protect the core of an optical fiber from interference caused by pressure and temperature fluctuations. In the preferred embodiment, glasses based on $Ta_2O_5$ having a Young's Modulus(E) greater than $11 \times 10^{11}$ dyn/cm$^2$ and a linear thermal expansion coefficient($\alpha$) below $3.2 \times 10^{-6} K^{-1}$ at 20° C. are used to protect the core of a typical optical fiber cable thereby making the cable insensitive to temperature and pressure fluctuations.

Other objects, advantages, and novel features of the present invention will become apparent from the following detailed description of the invention.

DETAILED DESCRIPTION OF THE INVENTION

Figure 1:
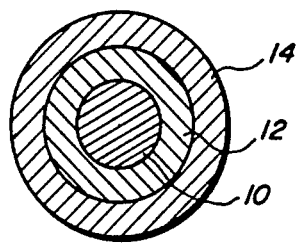
FIG. 1 is a cross sectional view of a typical optical fiber having a core, cladding, and substrate coating.

Glass compositions were formulated that exhibit a high Young's modulus(E), a high bulk modulus(K), and an unusually small linear thermal expansion coefficient($\alpha$). A calcium aluminate glass composition was tested initially, and variations in composition were made to find a composition that would also show a low thermal expansion coefficient. For several of the glasses, the main variation of the basic melt was the systematic substitution of $Ta_2O_5$ for CaO. For the remaining glasses $ZrO_2$ replaced $Ta_2O_5$ and minor changes were made in the relative amounts of other components, including adding $B_2O_3$ and $Nb_2O_5$. Table 1 lists the compositions by weight percent of the glasses studied, $\alpha$, E, and $\nu$. Most of the values of E are greater than $11 \times 10^{11}$ dyn/cm$^2$. In the case of the $Ta_2O_5$-containing glasses, the value of $\alpha$ decreases as the amount of $Ta_2O_5$ increases and the amount of CaO decreases. A very low value has been obtained for glass K-1847, $\alpha = 2.84 \times 10^{-6}$ K$^{-1}$ at 20° C. Based upon this data, the disclosed low compressibility, low expansivity glass compositions were formulated.

The compositions are in the following weight percent ranges:

| | |
|---|---|
| CaO | 0-30% |
| $Al_2O_3$ | 15-25% |
| MgO | 5-15% |
| $TiO_2$ | 0-15% |
| $ZrO_2$ | 0-10% |
| $SiO_2$ | 20-35% |
| $B_2O_3$ | 0-10% |
| $Ta_2O_5$ | 5-45% |
| $Nb_2O_5$ | 0-40% |

Particular compositions show desirable combinations of properties. The highest Young's modulus was exhibited by the glass with the following composition:

| | | |
|---|---|---|
| $Al_2O_3$ | 20% | $E = 12.1 \times 10^{11}$ dyn/cm$^2$ |
| MgO | 10% | $K = 8.8 \times 10^{11}$ dyn/cm$^2$ |
| $SiO_2$ | 25% | $\alpha = 3.1 \times 10^{-6}$/°C. at 20° C. |
| $Ta_2O_5$ | 45% | |

The highest bulk modulus was exhibited by the glass with the following composition:

| | | |
|---|---|---|
| CaO | 5% | $E = 11.9 \times 10^{11}$ dyn/cm$^2$ |
| $Al_2O_3$ | 20% | $K = 9.1 \times 10^{11}$ dyn/cm$^2$ |
| MgO | 10% | $\alpha = 4.4 \times 10^{-6}$/°C. at 20° C. |
| $TiO_2$ | 10% | |
| $SiO_2$ | 25% | |
| $Ta_2O_5$ | 30% | |

The smallest linear thermal expansion coefficient was exhibited by the glass with the following composition:

| | | |
|---|---|---|
| $Al_2O_3$ | 20% | $E = 10.8 \times 10^{11}$ dyn/cm$^2$ |
| MgO | 10% | $K = 7.6 \times 10^{11}$ dyn/cm$^2$ |
| $SiO_2$ | 30% | $\alpha = 2.7 \times 10^{-6}$/°C. at 20° C. |
| $Ta_2O_5$ | 35% | |
| $B_2O_3$ | 5% | |

The following glass composition was optimized to possess a large bulk modulus and a small linear thermal expansion coefficient:

| | | |
|---|---|---|
| $Al_2O_3$ | 20% | $E = 11.3 \times 10^{11}$ dyn/cm$^2$ |
| MgO | 10% | $K = 8.5 \times 10^{11}$ dyn/cm$^2$ |
| $TiO_2$ | 5% | $\alpha = 2.9 \times 10^{-6}$/°C. at 20° C. |
| $SiO_2$ | 35% | |
| $Ta_2O_5$ | 30% | |

Although BeO could be incorporated without significantly changing the desired properties, the glass compositions were formulated without including BeO as a constituent because of its potential toxicity.

The compositions of the present invention are used to protect the core or the core and cladding of the typical optical fiber. Depending upon the composition used, the resulting optical fiber will be insensitive to fluctuations in temperature and pressure. Referring to the drawings, FIG. 1 shows a typical optical fiber having a core 10, cladding 12, and substrate 14. The compositions of the present invention can be used to form the cladding 12 and have one or more optional temperature and pressure resistant glass protective substrate layers 14 to further protect the fiber from the environment. Alternatively, the compositions of the present invention can be used to form one or more temperature and pressure resistant glass protective substrate layers 14 to protect a core and cladding formed from other glass materials.

Figure 2:
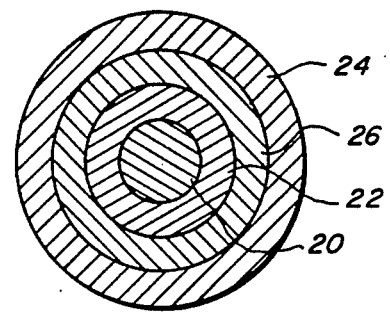
FIG. 2 is a cross sectional view of an optical fiber having the pressure and temperature resistant glass protective layer concentrically surrounding the core and cladding, and having a substrate layer protecting the fiber.

FIG. 2 shows another embodiment of the optical fiber of the present invention having a core 20, cladding 22, substrate layers 24, and a temperature and pressure resistant glass protective layer 26. One or more substrate layers 24 can be applied to the glass protective layer to protect the fiber from moisture, chemical corrosion, etc. One or more substrate layers can also be placed between the cladding and the glass protective layer.

Figure 3:
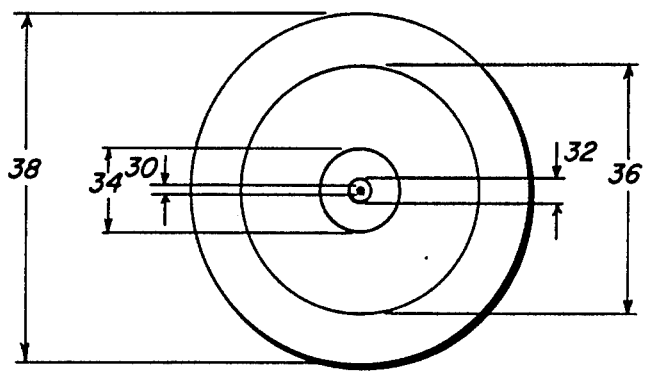
FIG. 3 is a cross sectional view of an optical fiber having the pressure and temperature resistant glass protective layer concentrically surrounding the core, cladding, and substrate, and having a additional substrate layer protecting the fiber.

FIG. 3 shows an optical fiber having the glass protection layer 36 concentrically surrounding the core 30, cladding 32 and substrate layers 34. Additional substrate layers 18 are added to further protect the fiber.

Figure 4:
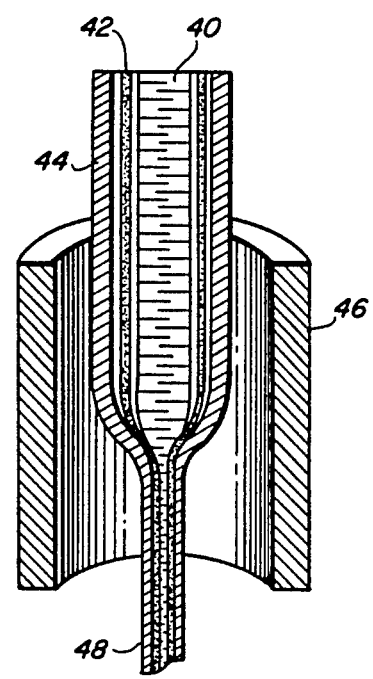
FIG. 4 is a cross sectional view of an optical fiber and furnace being drawn according to the present invention.

FIG. 4 shows fiber preform 40, protective glass composition 42, and substrate 44 being drawn in furnace 46 to form a fiber 48.

Figure 5A:
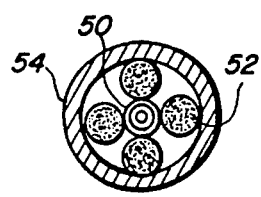
FIG. 5a is a top view of the preform, protective glass rods, and substrate before they are drawn into the fiber.
Figure 5B:
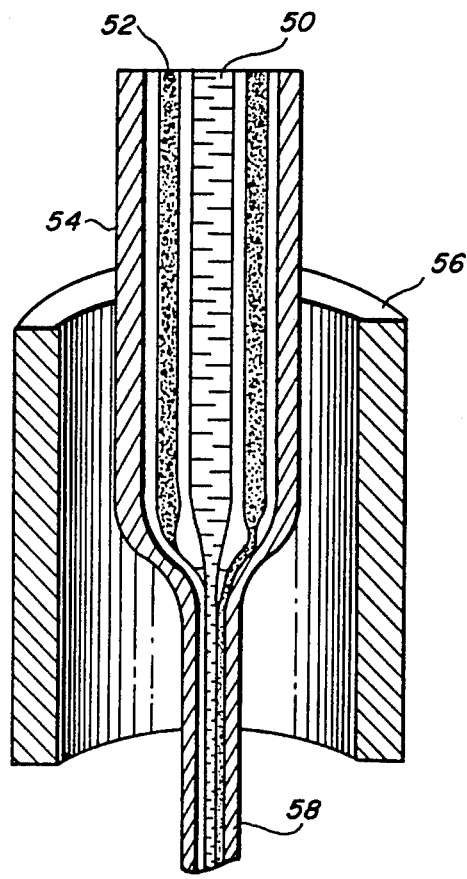
FIG. 5b is a cross sectional view of an optical fiber and furnace being drawn according to the present invention.

FIG. 5a shows a fiber preform 50 surrounded by glass protective composition rods 52 and a substrate 54 before they are drawn into a fiber. The arrangement of materials shown in FIG. 5a is drawn through furnace 56 to form the fiber 58 as shown in FIG. 5b.

The invention having been generally described, the following examples are given as particular embodiments of the invention and to demonstrate the practice and advantages thereof. It is understood that the examples are given by way of illustration and are not intended to limit the specification or the claims to follow in any manner. The examples give a general method that was used with each of the glass compositions.

EXAMPLE I

Measuring E and ($\alpha$)

Each glass composition listed in Table 1 was melted in a platinum crucible and stirred for at least two hours with a platinum-rhodium alloy stirrer. The melt was then cast in the shape of a slab from which bars, and smaller pieces could be cut for test specimens. The slabs were annealed before cutting.

The linear thermal expansion coefficients of the glasses were obtained by an optical interference method that used the collimated light from a HeNe laser or an Argon-ion laser. The interferometer assembly consisted of two optical flats separated by a specimen in the shape of a tripod which was about 7 mm thick. A pattern of localized interference fringes was formed between the two flats because the three legs of the tripod were very nearly the same length. The interferometer assembly was placed in a variable temperature apparatus which was capable of varying the temperature between −180° C. and 200° C. The temperature was monitored by two type "E" thermocouples in contact with the specimen. A single interference fringe was focused onto a slit and the transmitted light was detected by a Si photodiode. The signal was monitored on a strip chart recorder. As the temperature of the interferometer was increased, a series of maxima and minima was observed on the strip chart recorder, and from these data the linear thermal expansion coefficient was computed.

A dynamic or sonic method was used to measure Young's modulus and Poisson's ratio ($v$). A specimen was prepared in the shape of a rectangular bar with dimensions approximately 10 mm × 20 mm × 100 mm. A piezoelectric phonograph pick-up in contact with the specimen at one end was driven by a variable frequency oscillator. A second photograph pick-up was placed in contact with the specimen at the opposite end. The signal from the second pick-up was detected with either a high pass amplifier or an oscilloscope. Natural vibrational resonances of the specimen were obtained by observing peaks in the output signal of the second pick-up as the oscillator frequency was varied. The resonant frequencies were measured on a digital frequency meter. The fundamental flexural and torsional modes were determined by finding the vibrational nodes in the specimen. From these two frequencies, the specimen dimensions and the specimen mass, we calculated E and $v$.

EXAMPLE II

Producing Optical Fibers

To reduce the pressure sensitivity of an optical fiber, a protective glass layer was applied to the fiber during its drawing process. To maximize the strength of fatigue resistance of this fiber, a high silica layer was applied simultaneously during the fiber drawing. The proposed fiber construction is shown in FIG. 3. The first three layers were the standard optical fiber construction; namely: core 30, optical cladding 32, and silica substrate 34. The fourth layer was a protective glass layer 36 with 280 μm of layer thickness. The outer most layer 38, was a low thermal expansion layer, typically Vycor, which provides high surface compression for mechanical protection.

Two approaches achieve the new fiber construction are as follows. The first approach was to apply the protective glass in a tubular form. In the second approach, the protective glass was applied in a rod form. Both processes will be discussed in detail below.

Approach I: Rod and Tube Technique

Referring to FIG. 4, a protective glass tube 42 was inserted inside the Vycor tubing 44 and a preform 40 was placed inside of the protective glass tubing 42. In order to insure high concentricity of the fiber, all glasses were rigidly mounted, such that the concentricity of the tubings is maintained during the drawing process. Using well known methods, the composite structure was then drawn into a fiber 48 using a high temperature draw tower 46. A thin wall of Vycor tubing was utilized to maximize the surface compression and improve strength and fatigue characteristics of the optical fiber. Furthermore, a thin outer cladding on the fiber will reduce its outer diameter and improve flexibility. The fiber was formed in line with silicone and Hytrel to preserve its mechanical integrity.

Approach II: Molten Glass Coating

The preform 50, protective glass rods 52, and Vycor tubing 54, were arranged as shown in FIG. 5. Four protective glass rods 52 were inserted in the silica tubing 54 with the preform 50 in the center. Using well known methods, the composite structure was mounted on the high temperature draw tower 56 and drawn into a fiber 58. Furthermore, this fiber was formed in line with silicone and Hytrel protective jackets. This technique can be successfully applied, if the protective glass has a much lower softening point than that of $SiO_2$. In this case, the glass rods melt near the furnace hot zone and form a glass pool at the draw down region.

The methods of Examples I and II were used to form preforms for several glass compositions and test their properties. The results are summarized in Table 1.

Obviously many modifications and variations of the present invention are possible in light of the above teachings. It is therefore to be understood that within the scope of the appended claims the invention may be practiced otherwise than as specifically described.

TABLE 1

| Glass No. | CaO | $Al_2O_3$ | MgO | $TiO_2$ | $ZrO_2$ | $SiO_2$ | $Ta_2O_5$ | $Nb_2O_5$ | $B_2O_3$ | Young's Modulus | Shear Modulus ($10^{11}$ dyn/cm²) | Bulk Modulus | Poisson's Ratio $v$ | $\alpha$ ($10^{-6}$/K) at 20° C. |
|---|---|---|---|---|---|---|---|---|---|---|---|---|---|---|
| | | | | | weight % | | | | | | | | | |
| K-1671 | 25 | 25 | 10 | 10 | 10 | 20 | | | | 11.62 | 4.52 | 9.01 | 0.285 | 6.49 |
| K-1679 | 25 | 20 | 10 | 10 | 10 | 25 | | | | 11.45 | 4.45 | 8.92 | 0.286 | 6.21 |
| K-1689 | 30 | 15 | 10 | 10 | 10 | 25 | | | | 11.31 | 4.40 | 8.81 | 0.286 | 7.21 |
| K-1701 | 25 | 20 | 10 | 10 | | 25 | 10 | | | 11.20 | 4.37 | 8.52 | 0.281 | 6.75 |
| K-1703 | 20 | 20 | 10 | 10 | | 25 | 15 | | | 11.46 | 4.46 | 8.88 | 0.285 | 5.95 |
| K-1717 | 20 | 20 | 15 | 10 | | 25 | 10 | | | 11.55 | 4.50 | 8.87 | 0.283 | 6.48 |
| K-1719 | 20 | 20 | 10 | 15 | | 25 | 10 | | | 11.48 | 4.49 | 8.66 | 0.279 | 6.07 |
| K-1729 | 15 | 20 | 10 | 10 | | 25 | 20 | | | 11.65 | 4.54 | 8.99 | 0.284 | 5.62 |
| K-1733 | 10 | 20 | 10 | 10 | | 25 | 25 | | | 11.62 | 4.56 | 8.65 | 0.276 | 4.85 |
| K-1734 | 5 | 20 | 10 | 10 | | 25 | 30 | | | 11.90 | 4.65 | 9.06 | 0.281 | 4.35 |
| K-1772 | 0 | 20 | 10 | 10 | | 30 | 30 | | | 11.56 | 4.63 | 7.71 | 0.250 | 3.21 |
| K-1780 | | 20 | 20 | 5 | | 35 | 30 | | | 11.31 | 4.42 | 8.52 | 0.279 | 2.94 |
| K-1787 | | 20 | 10 | | | 35 | 35 | | | 11.04 | 4.39 | 7.54 | 0.256 | 2.88 |
| K-1788 | | 20 | 10 | | | 30 | 40 | | | 11.52 | 4.57 | 8.07 | 0.262 | 2.94 |
| K-1789 | | 20 | 10 | | | 25 | 45 | | | 12.14 | 4.78 | 8.82 | 0.271 | 3.13 |
| K-1824 | | 20 | 10 | | | 30 | 20 | 20 | | 11.36 | 4.48 | 8.12 | 0.268 | 3.02 |
| K-1825 | | 20 | 20 | | | 30 | | 40 | | 11.30 | 4.45 | 8.14 | 0.268 | 3.22 |
| K-1847 | | 20 | 10 | | | 26.25 | 35 | | 8.75 | 10.52 | 4.22 | 6.88 | 0.245 | 2.84 |
| K-1848 | | 20 | 10 | | | 30 | 35 | | 5.0 | 10.78 | 4.26 | 7.63 | 0.263 | 2.69 |

What is claimed is:

1. A glass composition suitable for use as a temperature and pressure insensitive protective layer for optical fibers, comprising:
   up to about 30 weight percent CaO;
   between about 15–25 weight percent $Al_2O_3$;
   between about 5–15 weight percent MgO;
   up to about 15 weight percent $TiO_2$;
   up to about 10 weight percent $ZrO_2$;
   between about 20–35 weight percent $SiO_2$;
   up to about 10 weight percent $B_2O_3$;

between about 5–45 weight percent $Ta_2O_5$; and
up to about 40 weight percent $Nb_2O_5$.

2. The glass composition of claim 1, comprising;
   about 20 weight percent $Al_2O_3$;
   about 10 weight percent MgO;
   about 25 weight percent $SiO_2$; and
   about 45 weight percent $Ta_2O_5$.

3. The glass composition of claim 1, comprising;
   about 5 weight percent CaO;
   about 20 weight percent $Al_2O_3$;
   about 10 weight percent MgO;
   about 10 weight percent $TiO_2$;
   about 25 weight percent $SiO_2$; and
   about 30 weight percent $Ta_2O_5$.

4. The glass composition of claim 1, comprising;
   about 20 weight percent $Al_2O_3$;
   about 10 weight percent MgO;
   about 30 weight percent $SiO_2$;
   about 35 weight percent $Ta_2O_5$; and
   about 5 weight percent $B_2O_3$.

5. The glass composition of claim 1, comprising;
   about 20 weight percent $Al_2O_3$;
   about 10 weight percent MgO;
   about 5 weight percent $TiO_2$;
   about 35 weight percent $SiO_2$: and
   about 30 weight percent $Ta_2O_5$.

6. An optical fiber, comprising:
   a solid cylindrical light-propagating core;
   a cladding concentrically surrounding said core; and
   a glass protective layer concentrically surrounding said cladding comprising
     up to about 30 weight percent CaO;
     between about 15–25 weight percent $Al_2O_3$;
     between about 5–15 weight percent MgO;
     up to about 15 weight percent $TiO_2$;
     up to about 10 weight percent $ZrO_2$;
     between about 20–35 weight percent $SiO_2$;
     up to about 10 weight percent $B_2O_3$;
     between about 5–45 weight percent $Ta_2O_5$; and
     up to about 40 weight percent $Nb_2O_5$.

7. The optical fiber of claim 6 having one or more substrate layers concentrically surrounding said glass protective layer.

8. The optical fiber of claim 6 having one or more substrate layers concentrically surrounding said cladding.

9. The optical fiber of claim 6 wherein said glass composition comprises:
   about 20 weight percent $Al_2O_3$;
   about 10 weight percent MgO;
   about 25 weight percent $SiO_2$; and
   about 45 weight percent $Ta_2O_5$.

10. The optical fiber of claim 6 wherein said glass composition comprises:
    about 5 weight percent CaO;
    about 20 weight percent $Al_2O_3$;
    about 10 weight percent MgO;
    about 10 weight percent $TiO_2$;
    about 25 weight percent $SiO_2$; and
    about 30 weight percent $Ta_2O_5$.

11. The optical fiber of claim 6 wherein said glass composition comprises:
    about 20 weight percent $Al_2O_3$;
    about 10 weight percent MgO;
    about 30 weight percent $SiO_2$;
    about 35 weight percent $Ta_2O_5$; and
    about 5 weight percent $B_2O_3$.

12. The optical fiber of claim 6 wherein said glass composition comprises:
    about 20 weight percent $Al_2O_3$;
    about 10 weight percent MgO;
    about 5 weight percent $TiO_2$;
    about 35 weight percent $SiO_2$; and
    about 30 weight percent $Ta_2O_5$.

13. An optical fiber, comprising:
    a solid cylindrical light-propagating core;
    a cladding concentrically surrounding said core, said cladding comprising
      up to about 30 weight percent CaO;
      between about 15–25 weight percent $Al_2O_3$;
      between about 5–15 weight percent MgO;
      up to about 15 weight percent $TiO_2$;
      up to about 10 weight percent $ZrO_2$;
      between about 20–35 weight percent $SiO_2$;
      up to about 10 weight percent $B_2O_3$;
      between about 5–45 weight percent $Ta_2O_5$; and
      up to about 40 weight percent $Nb_2O_5$.

14. The optical fiber of claim 13 having one or more substrate layers concentrically surrounding said cladding.

15. The optical fiber of claim 13 wherein said glass composition comprises:
    about 20 weight percent $Al_2O_3$;
    about 10 weight percent MgO;
    about 25 weight percent $SiO_2$; and
    about 45 weight percent $Ta_2O_5$.

16. The optical fiber of claim 13 wherein said glass composition comprises:
    about 5 weight percent CaO;
    about 20 weight percent $Al_2O_3$;
    about 10 weight percent MgO;
    about 10 weight percent $TiO_2$;
    about 25 weight percent $SiO_2$; and
    about 30 weight percent $Ta_2O_5$.

17. The optical fiber of claim 13 wherein said glass composition comprises:
    about 20 weight percent $Al_2O_3$;
    about 10 weight percent MgO;
    about 30 weight percent $SiO_2$;
    about 35 weight percent $Ta_2O_5$; and
    about 5 weight percent $B_2O_3$.

18. The optical fiber of claim 13 wherein said glass composition comprises:
    about 20 weight percent $Al_2O_3$;
    about 10 weight percent MgO;
    about 5 weight percent $TiO_2$;
    about 35 weight percent $SiO_2$; and
    about 30 weight percent $Ta_2O_5$.

19. A glass composition suitable for use as a temperature and pressure insensitive protective layer for optical fibers, consisting essentially of:
    up to about 30 weight percent CaO;
    between about 15–25 weight percnet $Al_2O_3$;
    between about 5–15 weight percent MgO;
    up to about 15 weight percent $TiO_2$;
    up to about 10 weight percent $ZrO_2$;
    between about 20–35 weight percent $SiO_2$;
    up to about 10 weight percent $B_2O_3$;
    between about 5–45 weight percent $Ta_2O_5$; and
    up to about 40 weight percent $Nb_2O_5$.

20. The glass composition of claim 19, consisting essentially of:
    about 20 weight percent $Al_2O_3$;
    about 10 weight percent MgO;
    about 25 weight percent $SiO_2$; and about 45 weight percent Ta$_2$O$_5$.
21. The glass composition of claim 19, consisting essentially of:
   about 5 weight percent CaO;
   about 20 weight percent Al$_2$O$_3$;
   about 10 weight percent MgO;
   about 10 weight percent TiO$_2$;
   about 25 weight percent SiO$_2$; and
   about 30 weight percent Ta$_2$O$_5$.
22. The glass composition of claim 19, consisting essentially of:
   about 20 weight percent Al$_2$O$_3$;
   about 10 weight percent MgO;
   about 30 weight percent SiO$_2$;
   about 35 weight percent Ta$_2$O$_5$; and
   about 5 weight persent B$_2$O$_3$.
23. The glass composition of claim 19, consisting essentially of:
   about 20 weight percent Al$_2$O$_3$;
   about 10 weight percent MgO;
   about 5 weight percent TiO$_2$;
   about 35 weight percent SiO$_2$; and
   about 30 weight persent Ta$_2$O$_5$.

* * * * *